United States Patent
Suryakantha et al.

(10) Patent No.: US 11,544,582 B2
(45) Date of Patent: Jan. 3, 2023

(54) PREDICTIVE MODELLING TO SCORE CUSTOMER LEADS USING DATA ANALYTICS USING AN END-TO-END AUTOMATED, SAMPLED APPROACH WITH ITERATIVE LOCAL AND GLOBAL OPTIMIZATION

(71) Applicant: DALCHEMY INC., Milpitas, CA (US)

(72) Inventors: Kanchana Suryakantha, Karnataka (IN); Kashyap Subramanya, Karnataka (IN); Vasanti Hegde, Karnataka (IN); Rajaram Venkatesha Rao Kudli, Karnataka (IN)

(73) Assignee: Ambertag, Inc., Milpitas, CA (US)

( * ) Notice: Subject to any disclaimer, the term of this patent is extended or adjusted under 35 U.S.C. 154(b) by 667 days.

(21) Appl. No.: 15/423,541

(22) Filed: Feb. 2, 2017

(65) Prior Publication Data
US 2017/0220954 A1    Aug. 3, 2017

Related U.S. Application Data

(60) Provisional application No. 62/290,407, filed on Feb. 2, 2016.

(51) Int. Cl.
*G06N 5/04* (2006.01)
*G06N 20/00* (2019.01)
*G06Q 10/06* (2012.01)
*G06Q 30/02* (2012.01)

(52) U.S. Cl.
CPC .............. *G06N 5/04* (2013.01); *G06N 20/00* (2019.01); *G06Q 10/067* (2013.01); *G06Q 30/0201* (2013.01)

(58) Field of Classification Search
CPC ........ G06N 20/00; G06N 5/04; G06Q 10/067; G06Q 30/0201
See application file for complete search history.

(56) References Cited

U.S. PATENT DOCUMENTS

| | | | | |
|---|---|---|---|---|
| 2005/0234753 | A1* | 10/2005 | Pinto | G06Q 30/02 700/44 |
| 2012/0202226 | A1* | 8/2012 | Yahalom | G01N 33/57415 435/7.92 |
| 2012/0310539 | A1* | 12/2012 | Crockett | G16B 40/00 702/19 |
| 2015/0178811 | A1* | 6/2015 | Chen | G06Q 30/0631 705/26.7 |

(Continued)

OTHER PUBLICATIONS

Anonymous, "1.13. Feature Selection", retrieved Jan. 10, 2016, all pages (Year: 2016).*

(Continued)

*Primary Examiner* — Benjamin P Geib
(74) *Attorney, Agent, or Firm* — HM Law Group LLP; Vani Moodley, Esq.

(57) ABSTRACT

Embodiments of the present invention disclose system to determine the best model to perform lead scoring for a given data set. The system can perform a multi-step iterative procedure including variable selection, feature set selection, training data selection, model development, model validation and process optimization. The system also performs local and global optimizations iteratively to determine the best possible model for a given scenario.

19 Claims, 12 Drawing Sheets

(56) References Cited

U.S. PATENT DOCUMENTS

| | | | |
|---|---|---|---|
| 2016/0019267 A1* | 1/2016 | Kala | G06F 16/2465 |
| | | | 707/754 |
| 2017/0069216 A1* | 3/2017 | Vaughan | G16H 50/20 |
| 2017/0132516 A1* | 5/2017 | Zhang | G06Q 30/0202 |

OTHER PUBLICATIONS

Ray, Sunil "7 Steps of Data Exploration & Preparation—Part 2", Feb. 2015, Analytics Vidha, all pages (Year: 2015).*

Chen et al, "Advances in Knowledge Discovery and Data Mining", 2002, Springer, pp. 92-103 (Year: 2002).*

Beniwal etal, "Classification and Feature Selection Techniques in Data Mining", ResearchGate, all pages (Year: 2012).*

Das, Tapan Kumar. "A customer classification prediction model based on machine learning techniques." 2015 International Conference on Applied and Theoretical Computing and Communication Technology (iCATccT). IEEE, 2015. (Year: 2015).*

Bahari, T. Femina, and M. Sudheep Elayidom. "An efficient CRM-data mining framework for the prediction of customer behaviour." Procedia computer science 46 (2015): 725-731. (Year: 2015).*

\* cited by examiner

PREDICTIVE MODELLING TO SCORE CUSTOMER LEADS USING DATA ANALYTICS USING AN END-TO-END AUTOMATED, SAMPLED APPROACH WITH ITERATIVE LOCAL AND GLOBAL OPTIMIZATION

FIELD

Embodiments of the present invention relate to predictive modeling.

BACKGROUND

A business may rely on lead scoring to prioritize its response to a plurality of leads. Business leads may have different propensities to take an action in relation to business. Such actions may include buying a product sold by the business, signing up for a product or a service of the business, or signing up for a promotion associated with the business. Based on these propensities or scores, the business may tailor its approach to a user or customer.

SUMMARY

Embodiments of the present invention disclose predictive modeling techniques comprising a feedback driven mechanism to determine the best model for a given data set. The techniques include a multi-step iterative approach from variable selection, feature set selection, training data selection, model development, model validation and process optimization. Local and global optimizations may be performed iteratively to determine the best possible model for a given scenario.

DETAILED DESCRIPTION OF SOME EMBODIMENTS

Figure 1:
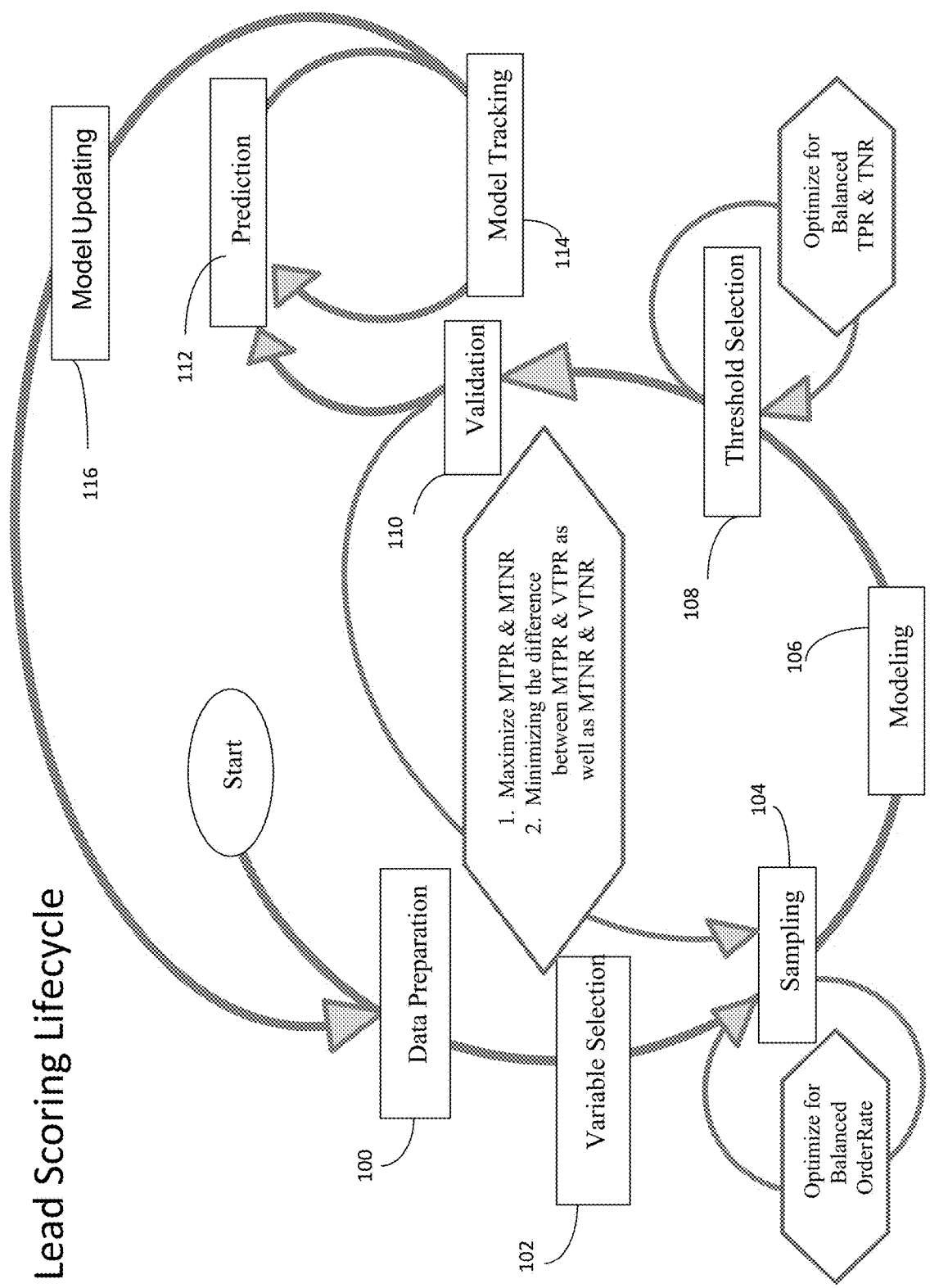
FIGS. 1-11 flowchart of operations, in accordance with one embodiment of the invention.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Embodiments of the present invention disclose predictive techniques for scoring leads that have potential to convert. Said techniques include a multi-step iterative process with feedback that has a combination of manual feature selection followed by automated sampling, model building, intelligent threshold selection and model validation which leads to the final model. In one embodiment, at each step there is iterative feedback.

Advantageously, the predictive techniques disclosed herein may be used to score for many parameters that have value to a business, such as:
1. Leads with a propensity to buy
2. Leads with a propensity to not buy
3. Leads with a propensity to perform a certain desired action
4. Potential time for a lead to perform the desired action
5. The method by which to engage with a particular lead
   a. Sales person to engage
   b. Channel for engagement
   c. Messaging
   d. Offer for engagement
   e. Packaging of an offer for engagement—Creative, look and feel, colors In one embodiment, thresholding may be used to create powerful models that can be used by a business to distinguish between buyers and non-buyers. For a prospect that is likely to buy, a business may instruct a key sales person to call said prospect immediately. For a prospect that is least likely to buy, a business may engage said prospect through low cost mechanisms such as text or email.

Very often, there is only a small amount of data available. This limits the building of effective models because models need sufficient data to be mathematically valid. Advantageously, embodiments of the invention use an iterative approach initiated with random sampling based generation of training and test data (RSAMP) to build a model, even in cases where there is sparse data.

Subsequently the model may be refined by using a True Positive Rate (TPR) and a True Negative Rate (TNR) to optimize the creation of a prioritized set of leads.

In one embodiment, the TPR may be defined as:

$$TPR = \frac{\text{Number of Enquiries Predicted as Potential Orders}}{\text{Number of Enquiries Actually Converted to Orders}}$$

and TNR may be defined as:

$$TNR = \frac{\text{Number of Enquiries Predicted as Potential Drops}}{\text{Number of Enquiries Actually Confirm as Drops}}$$

Where
MTPR=Model True Positive Rate

MTNR=Model True Negative Rate
VTPR=Validation True Positive Rate
VTNR=Validation True Negative Rate
Order Rate=Order/(Order+Drop)
Conversion Rate=Order/(Order+Drop+Warm)

Referring now to FIG. 1 of the drawings, there is shown a flowchart of a lead scoring lifecycle, in accordance with one embodiment of the invention. As will be seen, the lifecycle includes a data preparation step 100, a variable selection step 102, a sampling step 104, a modeling step 106, a threshold selection step 108, a validation step 110, a prediction step 112, a model tracking step 114, and a model updating step 116.

In one embodiment, the data preparation step 100 may include the following steps:
A. Variable Reduction: Customer data obtained from client is filtered to remove variables such as date and identification numbers. Missing or invalid data are also removed along with variables with too much variation or those with no variation in their parameters as these variables are not useful for analysis.
B. Identify Variables: Variables are identified as independent (like color, model/make) or dependent (like status).
C. Missing Value Imputation: Variables with a large percent of missing values are ignored while those within acceptable percentage of missing values are imputed with zero/median values.
D. Variable Creation: New variables are created by finding ratios, slopes, slope percentage and totals of existing variables. Dummy variable are also created by concatenating two independent variables.
E. Bivariate Analysis: Bivariate analysis is used for variable binning where variables are grouped together if their conversion levels are observed to be similar.

Figure 2:
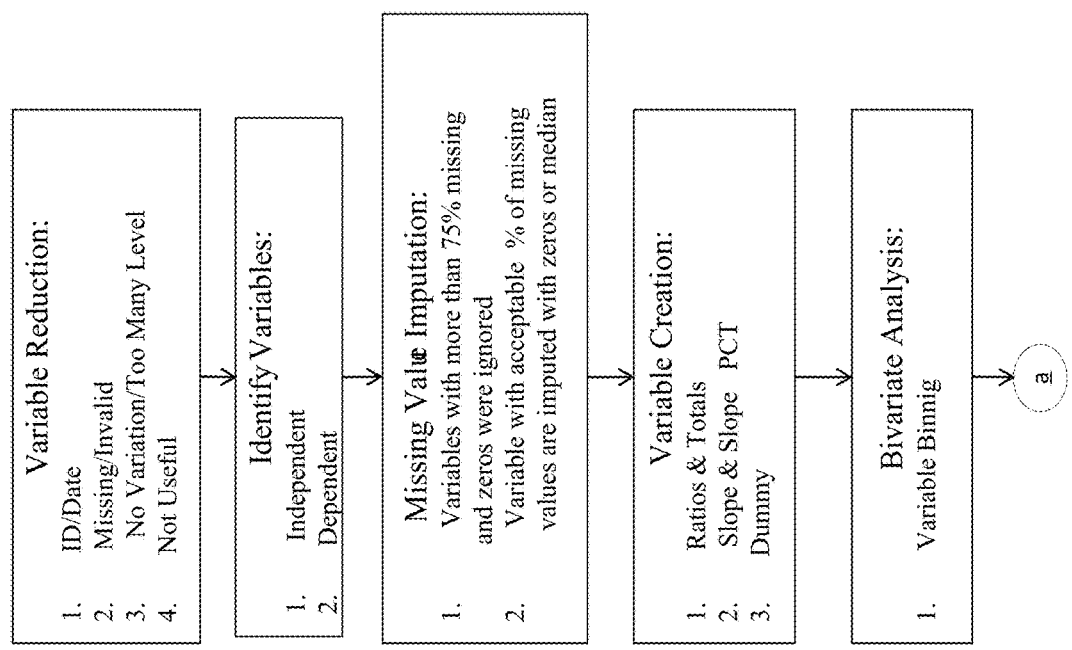

A flowchart of data preparation steps as provided in FIG. 2 of the drawings.

In one embodiment, the variable selection step 102 may include the following steps:
A. Multicollinearity: Variables which are highly collinear with other independent variables are removed.
B. Information Value: Variables are selected in such a way that they have a higher Information Value to the actual outcome (i.e. order or drop) as a lower Information Value shows a more random distribution of the data with respect to the variable.
C. Analysis is performed on the data to obtain the significant variables.

Figure 3:
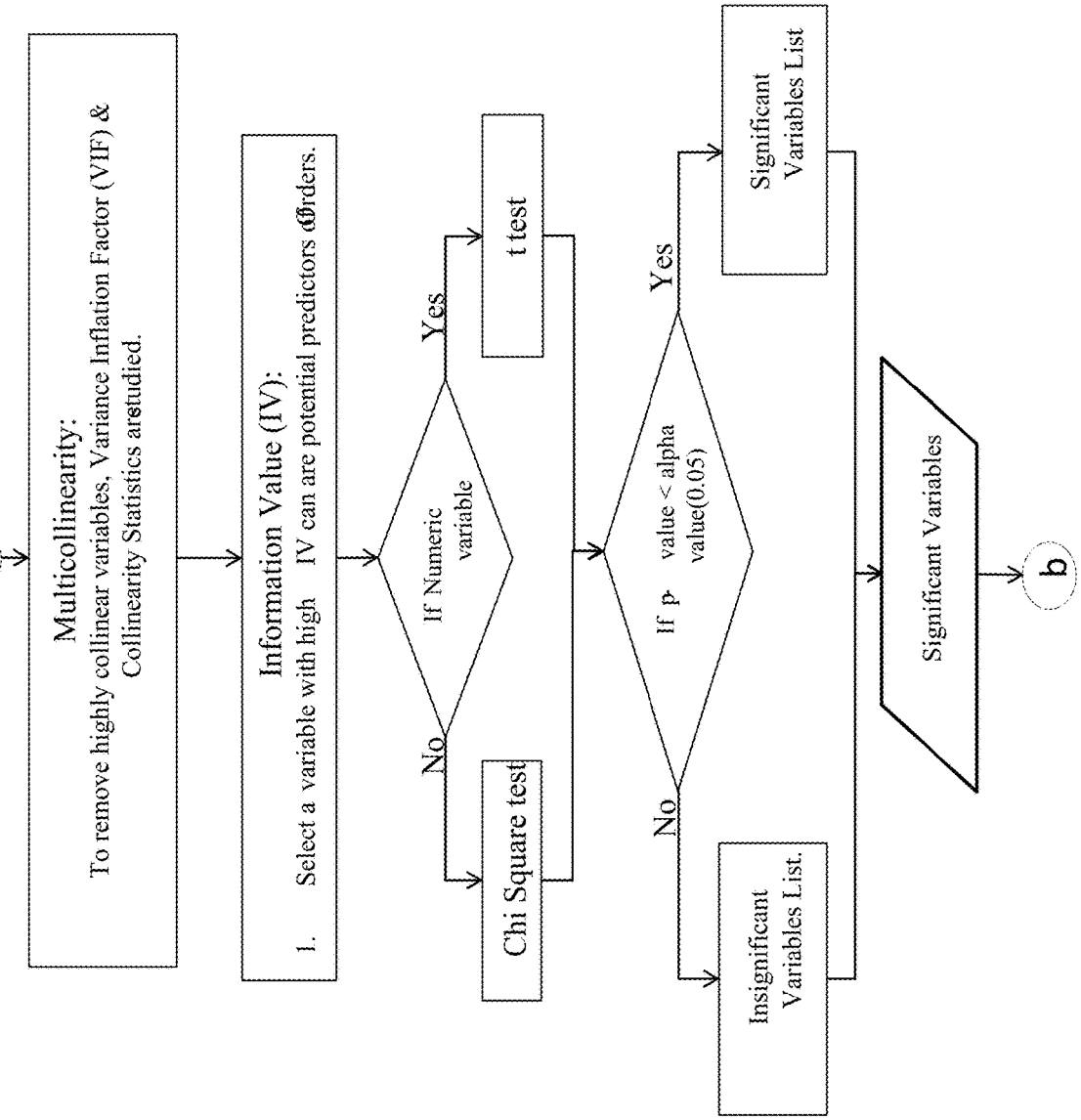

FIG. 3 of the drawings shows a flowchart of steps corresponding variable selection, in accordance with one embodiment of the invention.

Figure 4:
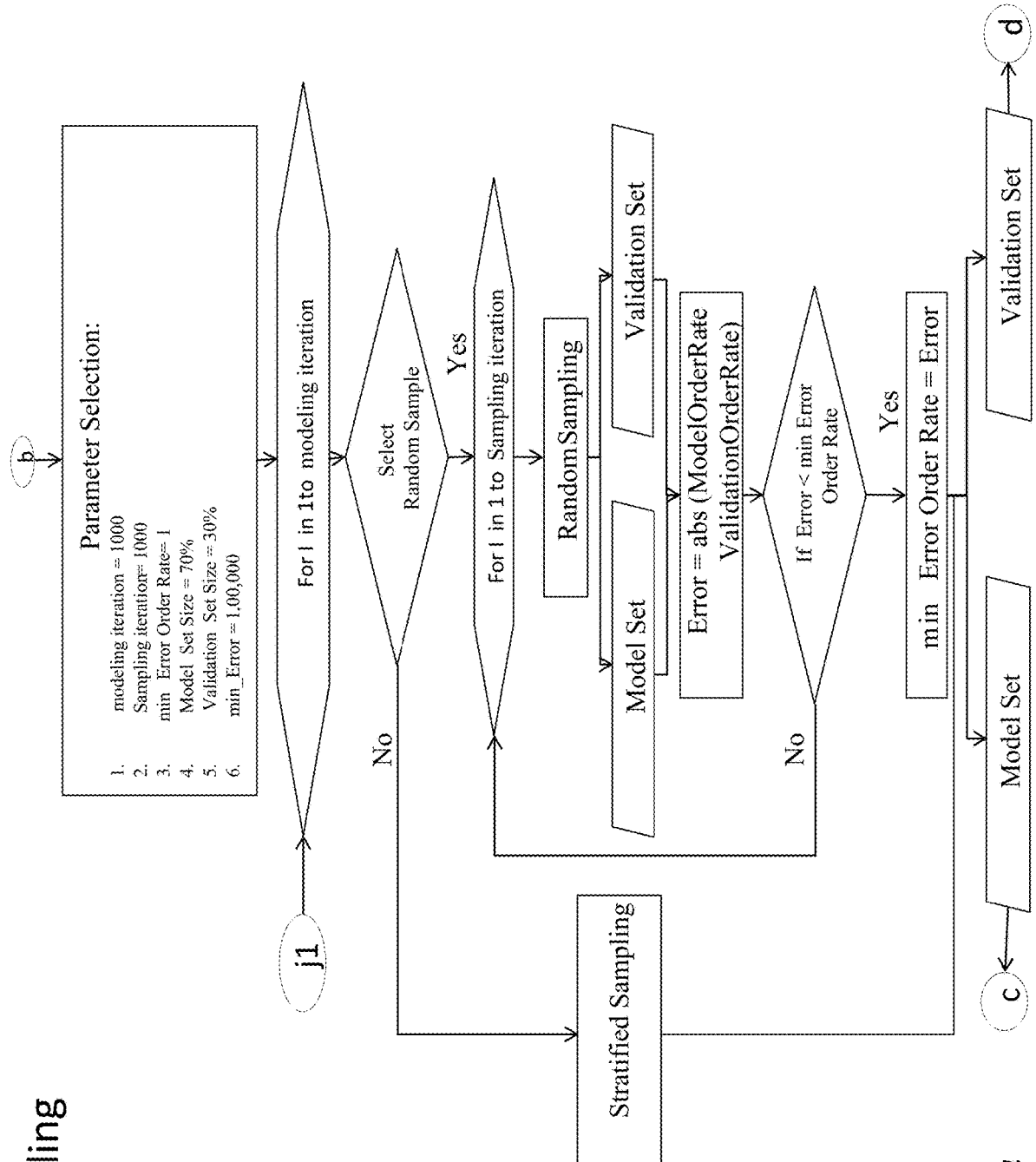
Figure 5:
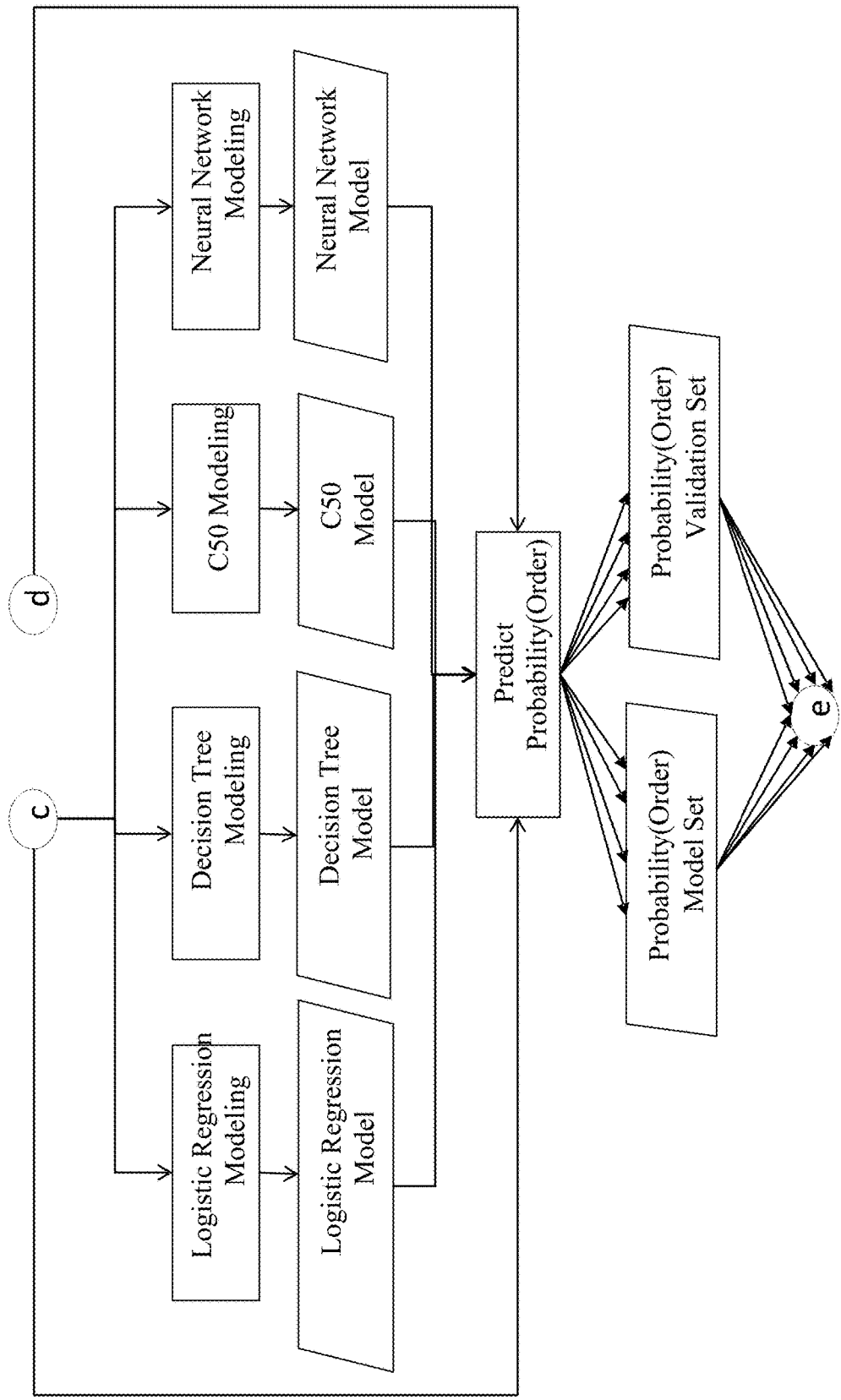

In one embodiment, under the sampling step 104 data is split into Model Set and Validation Set such that both are accurate representations of the general population. FIG. 4 shows a flowchart of steps corresponding to the sampling step 104, in accordance with one embodiment of the invention In one embodiment, the modeling step 106 may be performed based some of the general modeling techniques such as Logistic Regression Modeling, Decision Tree Modeling, C 50 Modeling and Neural Network Modeling and lead score values are obtained. FIG. 5 shows a flowchart of steps corresponding to the modeling step 104, in accordance with one embodiment of the invention.

In one embodiment, the validation step 110 may include the following steps performed to obtain the most appropriate model:

A. Lift Chart: A lift chart is used to determine the best model among the different models obtained.
B. Concordance Test: Another method used to validate the model is performing a concordance test.
C. Maximizing model TPR and TNR and Minimizing difference between Models and Validation TPR as well as TNR: Model TPR and TNR are maximized and the difference between model and validation TPR and TNR are minimized to reduce the error between the Model and Validation predictions.

Figure 6:
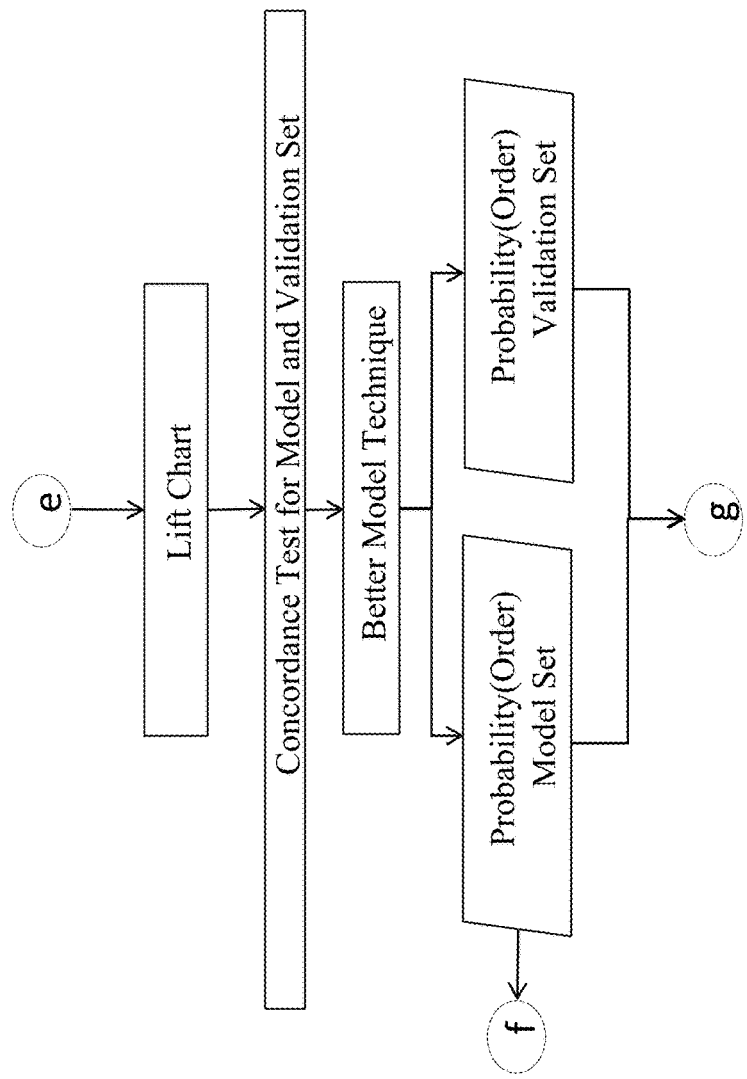

FIG. 6 shows the steps corresponding to the validation step 110, in accordance with one embodiment of the invention.

Figure 7:
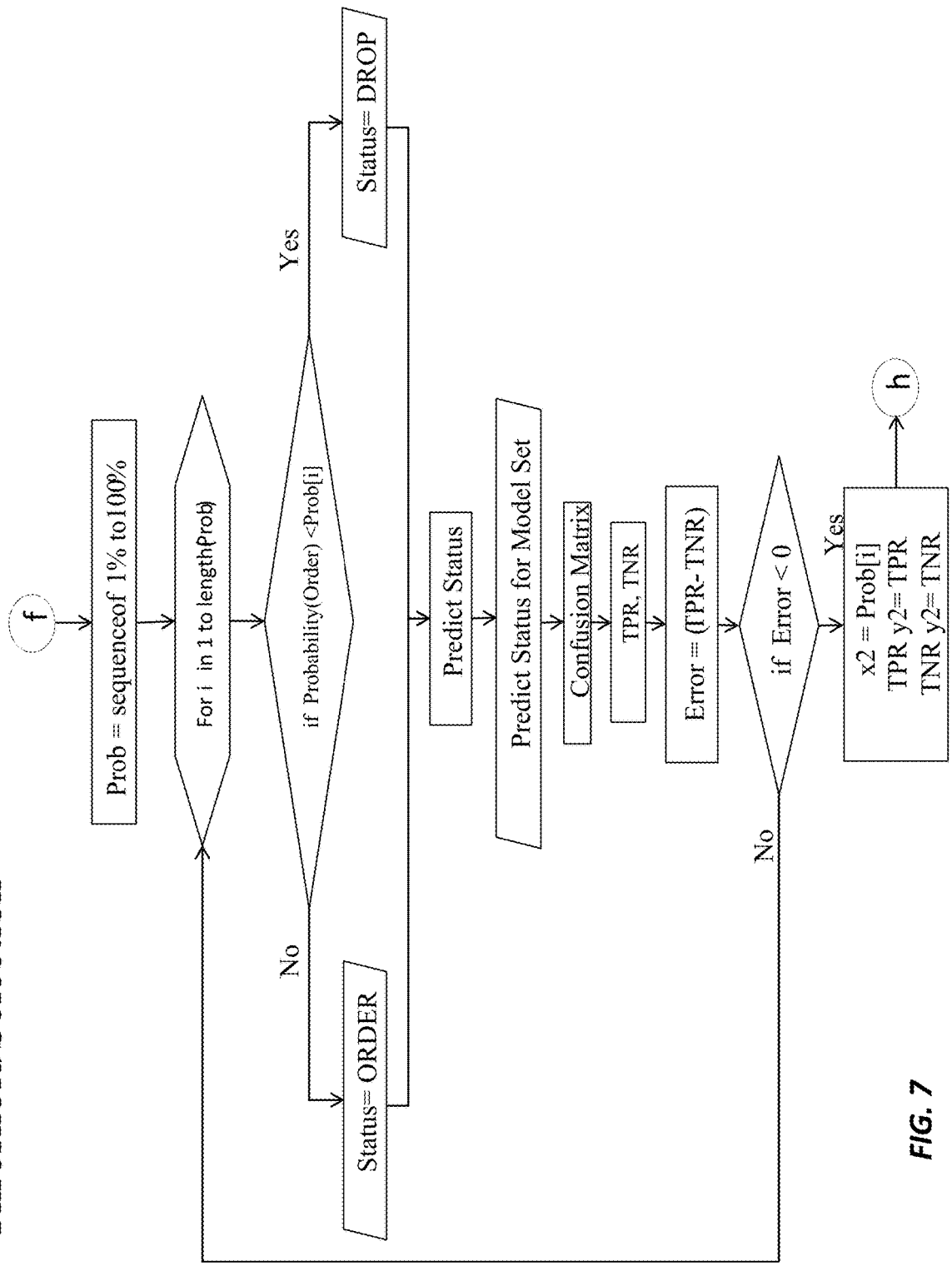
Figure 8:
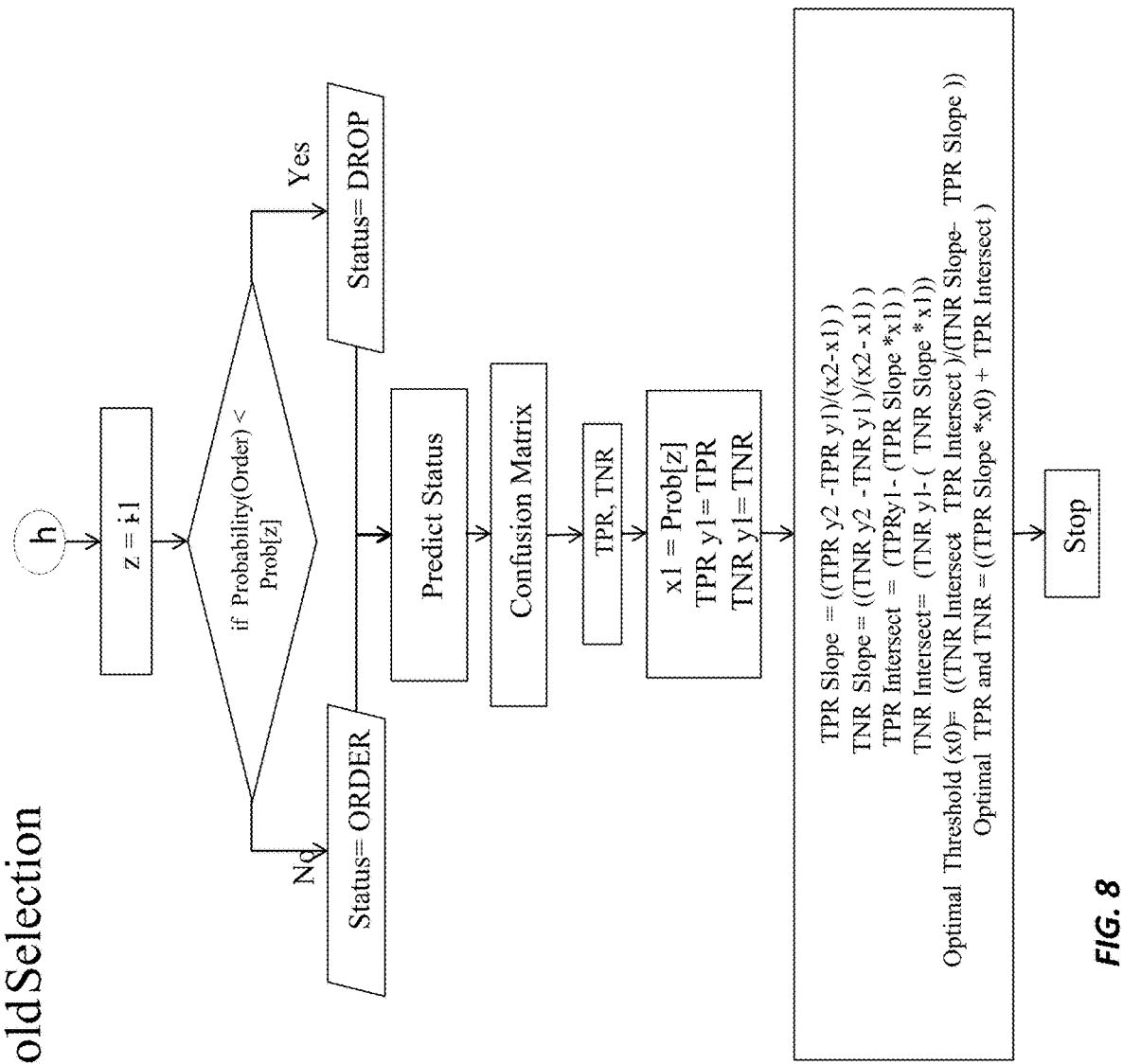

In one embodiment, under the threshold selection step 108, an optimal threshold is selected and lead score values greater than or equal to it are converted to '1' and those below it are converted to '0'. The optimal threshold is selected such that the True Positive Rate (TPR) and True Negative Rate (TNR) are as per the requirements of the client where, True Positive Rate is the proportion of actual positives which are correctly identified as such, and True Negative Rate is the proportion of actual negatives which are correctly identified as such. The steps corresponding to the threshold selection step 104, in accordance with one embodiment, is shown in the flowchart of FIGS. 7-8.

Figure 9:
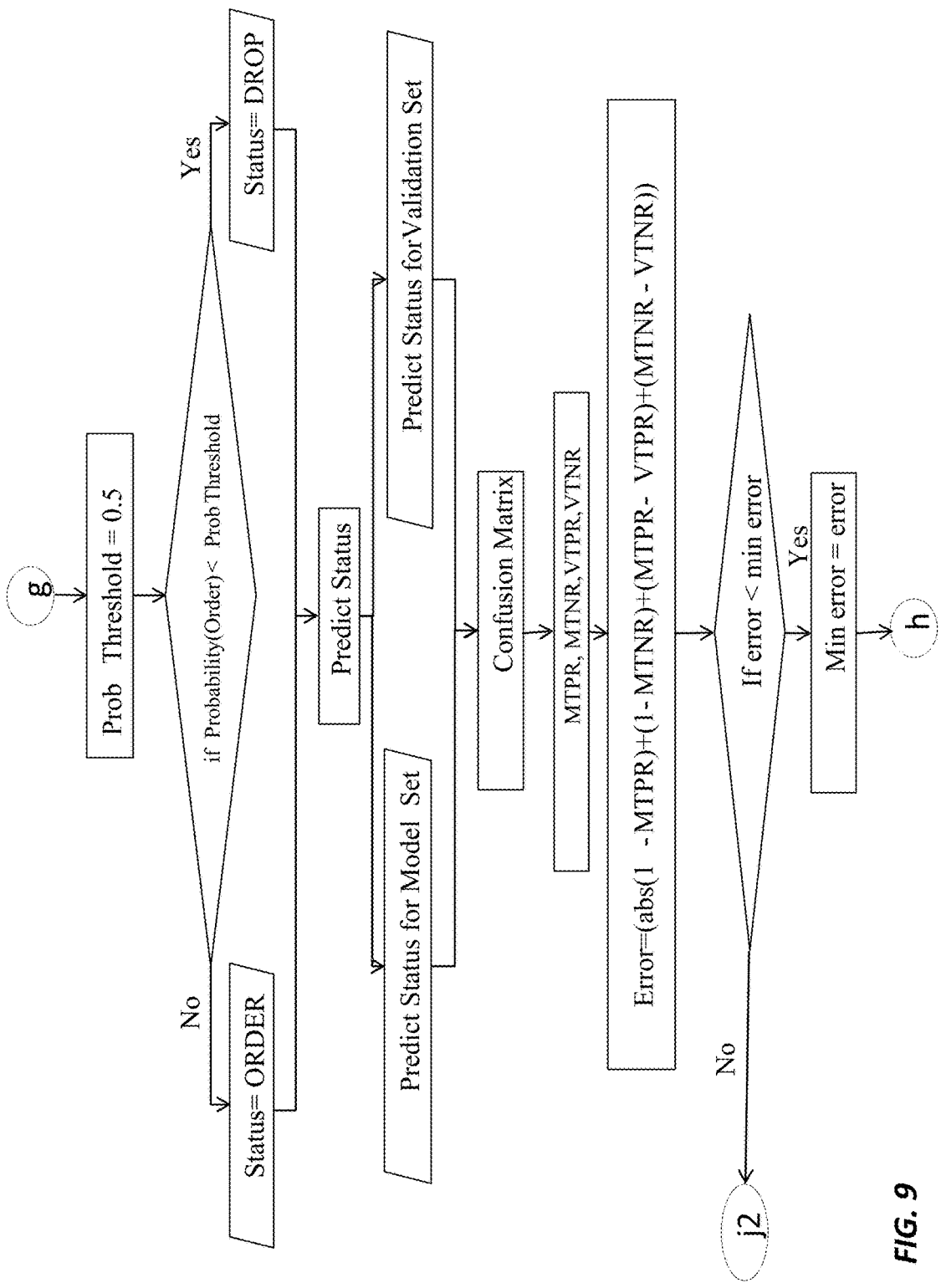

FIG. 9 shows a flowchart of the steps performed in order to maximize MTPR and MTNR, in accordance with one embodiment. The figure also sows the steps involved in minimizing the difference between MTPR and VTPR as well as MTNR and VTNR, in accordance with one embodiment of the invention.

Figure 10:
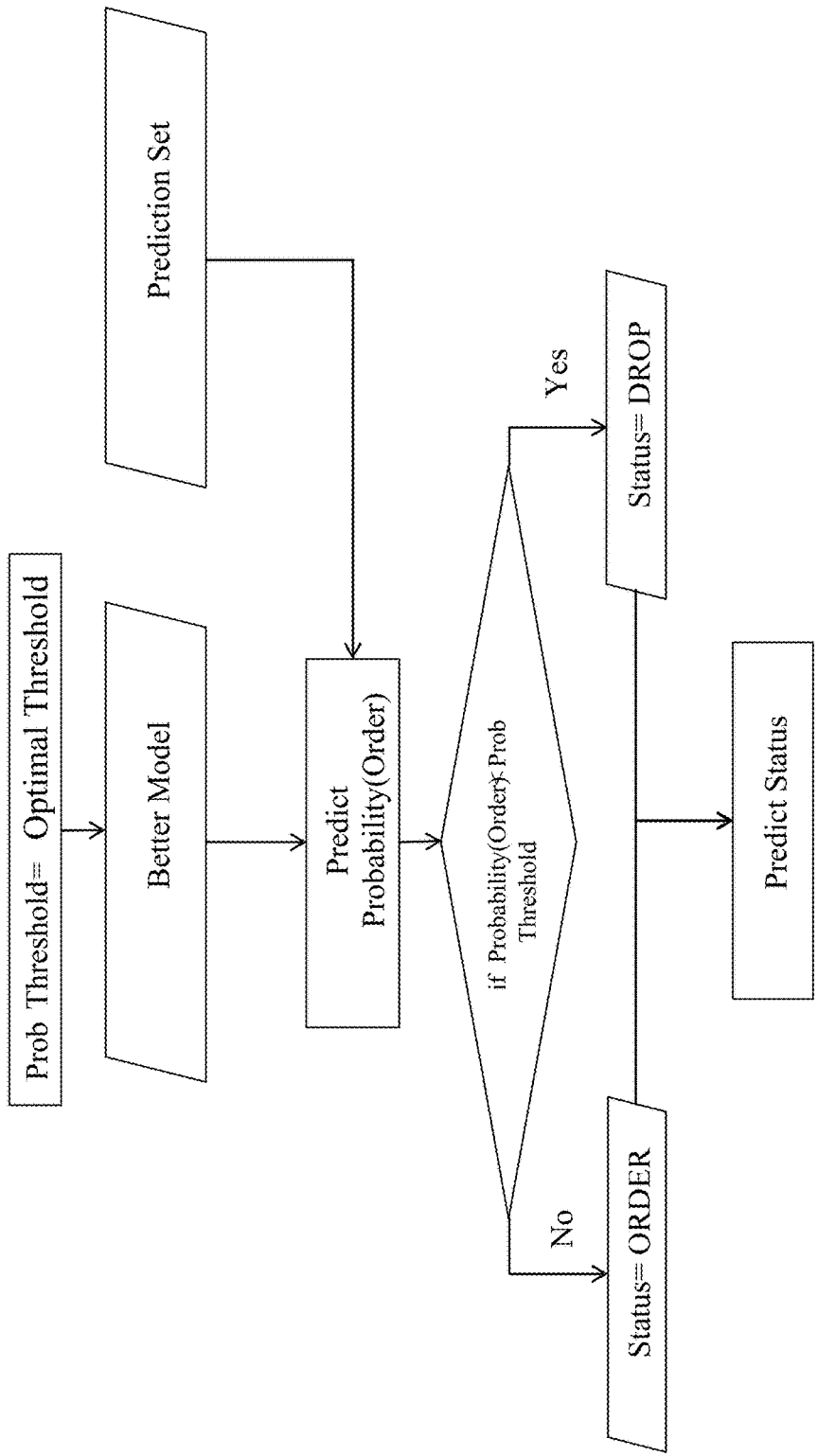
Figure 11:
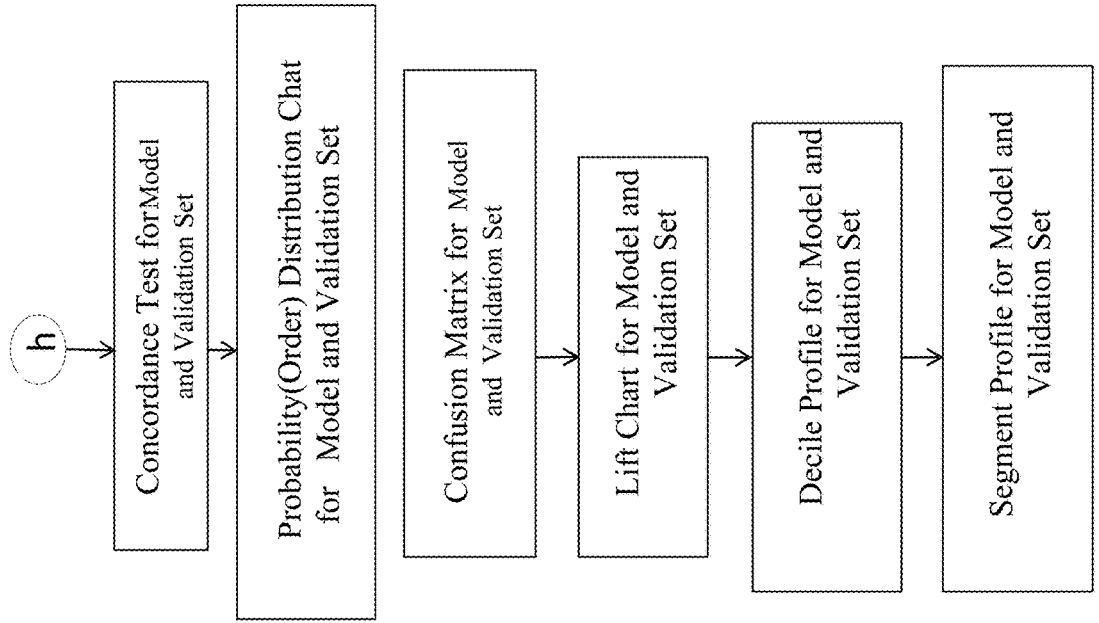

In one embodiment, under the prediction step 112, the model that has been built and validated is used to predict the lead scores for data other than those used in building the model and validation. A flowchart representing the prediction step 112, in accordance with one embodiment, is shown in FIG. 10 of the drawings.

In one embodiment, under the model tracking step 114, the predicted values are continuously tracked and verified against the actual data.

In one embodiment, under the model updating step 116, if model predictions are found to be below an accepted level, then the entire process is repeated and a new model is created or the existing model is updated.

Advantageously, by optimizing the difference between the MTPR and VTPR simultaneously with the difference between the MTNR and VTNR, a system embodying the predictive techniques disclosed herein is able to determine if RSAMP is the right starting point. In one embodiment, said system may continue to iterate to find the best RSAMP. Because RSAMP is based on random sampling followed by validation, the lead scoring models created have the best performance.

Figure 12:
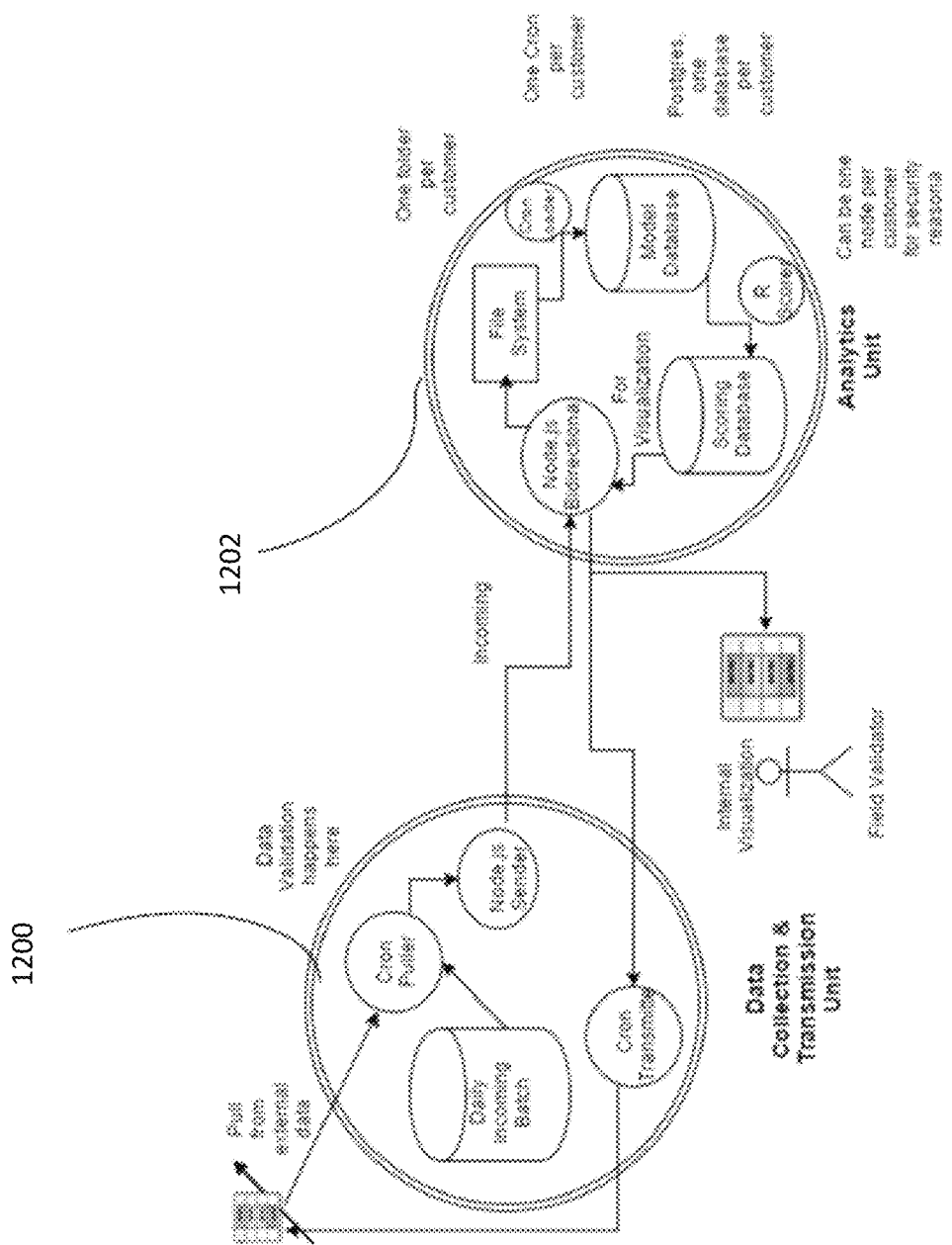
FIG. 12 shows a high-level block diagram of a software architecture for a system for predictive modeling, in accordance with one embodiment of the invention.

Turning now to FIG. 12 of the drawings, there is shown a software architecture for performing lead scoring, in accordance with the techniques disclosed herein. According to FIG. 12, a Data Collection and Transmission Unit (DCTU) 1200 receives the data from an external data source periodically. This data is validated and then transmitted to an Analytics Unit 1202, where it is stored in a file system. The unit 1202 includes globally optimized models stored in a Model Database. Said globally optimized models are built using historical data. Scored data is saved in a Scoring Database and set up for transmission back to the external data system that can make use of the lead scores.

In one embodiment, the architecture may comprise a plurality of units 1200, and 1202. Each unit of Data Collection and Transmission Unit (DCTU) 1200 may be a node and each Analytics Unit (AU) may be a node. Many DCTUs make coupled to a single AU and multiple AUs may be configured to use one DCTU to build and send different models to the same external system such as a bank, automotive dealer, mortgage insurance, etc.

Advantageously, many different customers' data and models may be served using the same architecture. The architecture allows unlimited scale by adding more nodes as needed and can be geographically distributed.

The processing steps described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive might be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media can include a computer usable storage medium having stored therein computer software or data.

In alternative embodiments, the database modules might include other similar instrumentalities for allowing computer programs or other instructions or data to be loaded into the computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module might include various communications interfaces such as an Ethernet, network interface card, WiMedia, IEEE 802.XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for lead scoring, comprising:
preparing a data set by using a median value for one or more missing values of variables in case a number of missing values of the variables is within a threshold level;
performing random sampling of the data set to generate training and test data;
building a model based on the training and test data;
refining the model by using a true positive rate (TPR) and a true negative rate (TNR); and
validating the model by simultaneously optimizing a difference between the TPR and a validation TPR and a difference between the TNR and a validation TNR.

2. The computer-implemented method of claim 1, wherein the $$TPR = \frac{\text{Number of Enquiries Predicted as Potential Orders}}{\text{Number of Enquiries Actually Converted to Orders}}.$$

3. The computer-implemented method of claim 1, wherein the $$TNR = \frac{\text{Number of Enquiries Predicted as Potential Drops}}{\text{Number of Enquiries Actually Confirm as Drops}}.$$

4. The computer-implemented method of claim 1, wherein the data set is further filtered to remove variables based on their usefulness.

5. The computer-implemented method of claim 1, wherein the preparing of the data set further comprises identifying independent variables and dependent variables.

6. The computer-implemented method of claim 1, further includes selecting variables, succeeding the step of preparing the data set, which includes:
ignoring variables with missing values up to a threshold percentage level;
creating new variables and dummy variables; and
grouping the variables based on their conversion levels.

7. The computer-implemented method of claim 1, wherein the validation of the model further comprises:
determining a model from a plurality of models using a lift chart; and
performing a concordance test to validate the model.

8. The computer-implemented method of claim 7, further comprises, succeeding the validation of the built model:
prediction of lead scores for the data set; and
tracking the predicted lead scores against an actual data.

9. The computer-implemented method of claim 8, further comprises building a new model or updating the built model based on a determination if the predicted lead scores are below a threshold.

10. A system to score lead comprising:
preparation of a data set by using a median value for one or more missing values of variables in case a number of missing values of the variables is within a threshold level;
perform random sampling of the data set to generate training and test data;
build a model based on the training and test data; and
refine the model by using a true positive rate (TPR) and a true negative rate (TNR); and
validate the model by simultaneously optimizing a difference between the TPR and a validation TPR and a difference between the TNR and a validation TNR.

11. The system of claim 10, wherein the $$TNR = \frac{\text{Number of Enquiries Predicted as Potential Drops}}{\text{Number of Enquiries Actually Confirmed as Drops}}.$$

12. The system of claim 10, wherein the data set is further filtered to remove variables based on their usefulness.

13. The system of claim 10, wherein the preparation of the data set further comprises identifying independent variables and dependent variables.

14. The system of claim 13, further includes selection of variables, succeeding the preparation of the data set, the selection of variables comprises:

ignore variables with missing values up to a threshold percentage level;

creation new variables and dummy variables; and group the variables based on their conversion levels.

15. The system of claim 10, wherein the validation of the built model further comprises:

determination of a model from a plurality of models using a lift chart; and perform a concordance test to validate the model.

16. The system of claim 15, further comprises, succeeding the validation of the built model:

prediction of lead scores for the data set; and tracking the predicted lead scores against an actual data.

17. The system of claim 16, further comprises building a new model or updating the built model based on a determination if the predicted lead scores are below a threshold.

18. The computer-implemented method of claim 1, wherein the model is validated by decreasing the difference between the TPR and the validated TPR and decreasing the difference between the TNR and the validated TNR iteratively.

19. The system of claim 10, wherein the $$TPR = \frac{\text{Number of Enquiries Predicted as Potential Orders}}{\text{Number of Enquiries Actually Converted to Orders}}.$$

* * * * *